United States Patent
Kubota et al.

(10) Patent No.: US 10,301,737 B2
(45) Date of Patent: May 28, 2019

(54) METHOD OF MANUFACTURING TIN-PLATED COPPER TERMINAL MATERIAL

(71) Applicant: MITSUBISHI MATERIALS CORPORATION, Tokyo (JP)

(72) Inventors: Kenji Kubota, Naka (JP); Yoshie Tarutani, Naka (JP); Kiyotaka Nakaya, Naka (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 0 days.

(21) Appl. No.: 15/778,336

(22) PCT Filed: Dec. 14, 2016

(86) PCT No.: PCT/JP2016/087137
§ 371 (c)(1),
(2) Date: May 23, 2018

(87) PCT Pub. No.: WO2017/104682
PCT Pub. Date: Jun. 22, 2017

(65) Prior Publication Data
US 2018/0347062 A1    Dec. 6, 2018

(30) Foreign Application Priority Data

Dec. 15, 2015 (JP) .................................. 2015-244311
Jul. 29, 2016 (JP) .................................. 2016-150740

(51) Int. Cl.
*C25D 5/50* (2006.01)
*C25D 3/22* (2006.01)
(Continued)

(52) U.S. Cl.
CPC .............. *C25D 5/505* (2013.01); *B32B 15/01* (2013.01); *B32B 15/20* (2013.01); *C22C 18/00* (2013.01);
(Continued)

(58) Field of Classification Search
CPC ................................ C25D 5/505; C25D 5/50
See application file for complete search history.

(56) References Cited

U.S. PATENT DOCUMENTS 6,613,451 B1    9/2003    Asahara et al.
9,537,243 B2 *  1/2017    Gaertner ................... C23C 2/06

FOREIGN PATENT DOCUMENTS

JP       08-041681 A    2/1996
JP       11-193494 A    7/1999
(Continued)

OTHER PUBLICATIONS

International Search Report dated Jan. 24, 2017, issued for PCT/JP2016/087137.

*Primary Examiner* — Brian W Cohen
(74) *Attorney, Agent, or Firm* — Locke Lord LLP (57) ABSTRACT

A method of manufacturing tin-plated copper terminal material as a terminal crimped to a terminal end of an electric wire made of an aluminum wire material, using a base member of copper or copper alloy in which galvanic corrosion is not easy to occur and an adhesiveness of a tin layer is excellent, the method includes: a zinc-nickel alloy layer forming step forming a zinc-nickel alloy layer having a nickel content of 5 mass % to 50 mass % inclusive and a thickness of 0.1 μm to 5.0 μm inclusive on a base member made of copper or copper alloy; and a tin-plating step forming a tin layer by tin plating on the zinc-nickel alloy layer; more preferably, following the tin-plating step, the method includes a diffusion treatment step diffusing zinc from the zinc-nickel alloy layer to the tin layer by main-
(Continued)

taining at 40° C. to 160° C. inclusive for 30 minutes or longer.

3 Claims, 6 Drawing Sheets

(51) Int. Cl.

| | | |
|---|---|---|
| C25D 3/12 | (2006.01) | |
| C25D 3/30 | (2006.01) | |
| C25D 5/34 | (2006.01) | |
| C22C 18/00 | (2006.01) | |
| B32B 15/01 | (2006.01) | |
| B32B 15/20 | (2006.01) | |
| H01B 13/00 | (2006.01) | |
| C25F 1/04 | (2006.01) | |

(52) U.S. Cl.
CPC ............... *C25D 3/12* (2013.01); *C25D 3/22* (2013.01); *C25D 3/30* (2013.01); *C25D 5/34* (2013.01); *C25F 1/04* (2013.01); *H01B 13/0036* (2013.01); *B32B 2307/202* (2013.01); *B32B 2457/00* (2013.01)

(56) References Cited

FOREIGN PATENT DOCUMENTS

| | | |
|---|---|---|
| JP | 2000-144482 A | 5/2000 |
| JP | 2000-169996 A | 6/2000 |
| JP | 2003-328157 A | 11/2003 |
| JP | 2004-134212 A | 4/2004 |
| JP | 2008-285729 A | 11/2008 |
| JP | 2013-218866 A | 10/2013 |
| JP | 2014-164927 A | 9/2014 |
| JP | 2015-133306 A | 7/2015 |
| WO | 2013161125 A1 | 10/2013 |

* cited by examiner

METHOD OF MANUFACTURING TIN-PLATED COPPER TERMINAL MATERIAL

BACKGROUND OF THE INVENTION

Technical Field

The present invention relates to a method of manufacturing tin-plated copper terminal material used as a terminal crimped to a terminal end of an electric wire made of aluminum wire material, having plating of tin or tin alloy on a surface of a base member made of copper or copper alloy.

Priority is claimed on Japanese Patent Application No. 2015-244311, filed Dec. 15, 2015, and Japanese Patent Application No. 2016-150740, filed Jul. 29, 2016, the content of which is incorporated herein by reference.

Background Art

Conventionally, a terminal made of copper or copper alloy is crimped to a terminal end part of an electric wire made of copper or copper alloy: this terminal is connected to a terminal provided at a different device so as to connect the electric wire to the different device. In order to reduce weight of the electric wire or the like, there is a case in which the electric wire is made of aluminum or aluminum alloy instead of copper and copper alloy.

For example, Patent Document 1 discloses an aluminum electric wire made of aluminum alloy, for a wire harness of a vehicle.

When the electric wire (a conductive wire) is made of aluminum or aluminum alloy and the terminal is made of copper or copper alloy, galvanic corrosion may occur by an electric potential difference between different metals if water touches a crimping part of the terminal and the wire. Therefore, following the corrosion of the electric wire, electric resistance may rise and a crimping force may deteriorated at the crimping part.

For example, Patent Documents 2 to 4 disclose methods for preventing the corrosion by the electric potential difference between the different metals.

Patent Document 2 disclose that a base member is made of iron or iron alloy though, forming an anti-corrosion layer made of metal having a sacrificial protection function against the base member between the base member and a tin layer: as the anti-corrosion layer, zinc, zinc-nickel alloy, brass, iron-chromium alloy and the like are exemplified.

Electric contact material for a connector disclosed in Patent Document 3 has a base member made of metal material, an alloy layer formed on the base member, and a conductive-film layer formed on a surface of the alloy layer: the alloy layer essentially includes Sn and one of or two or more additive elements selected from Cu, Zn Co, Ni, and Pd; and the conductive-film layer includes hydroxide oxide of $Sn_3O_2(OH)_2$. It is described that durability is improved under high-temperature environment and contact resistance can be maintained low for a long time period by the conductive-film layer including the hydroxide oxide of $Sn_3O_2(OH)_2$.

Patent Document 4 discloses Sn-plated material having a Ni-plating ground layer, an Sn—Cu plating intermediate layer, and an Sn-plating surface layer on a surface of copper or copper alloy in order: the Ni-plating ground layer is made of Ni or Ni alloy; the Sn—Cu plating intermediate layer is formed from Sn—Cu based alloy in which at least an Sn—Cu—Zn alloy layer is formed at a side adjacent to the Sn-plating surface layer; the Sn-plating surface layer is made of Sn alloy including Zn of 5 to 1000 mass ppm; and a high-concentrated Zn layer having Zn concentration of greater than 0.1 mass % but less than 10 mass % is further formed at an outermost surface.

CITATION LIST

Patent Document

Patent Document 1: Japanese Unexamined Patent Application, First Publication No. 2004-134212
Patent Document 2: Japanese Unexamined Patent Application, First Publication No. 2013-218866
Patent Document 3: Japanese Unexamined Patent Application, First Publication No. 2015-133306
Patent Document 4: Japanese Unexamined Patent Application, First Publication No. 2008-285729

SUMMARY OF INVENTION

Technical Problem

In a case in which a layer made of zinc or zinc alloy is provided as an anti-corrosion layer as described in Patent Document 2, since displacement of tin occurs when plating tin on the anti-corrosion layer, there is a problem in that the anti-corrosion layer and the tin layer cannot be in contact enough with each other.

Even in a case in which the hydroxide oxide layer of $Sn_3O_2(OH)_2$ is formed as in Patent Document 3, there is a problem in that durability is low since the hydroxide oxide layer is chipped quickly when it is exposed in corrosion environment and heating environment. Furthermore, in a case in which an Sn—Zn alloy is layered on an Sn—Cu based alloy layer and a zinc-concentrated layer is provided at an outermost layer as described in Patent Document 4; an anti-corrosion effect against an aluminum wire is disappeared when copper in the Sn—Cu alloy layer is exposed at an surface layer, and productivity of Sn—Zn alloy plating is low.

The present invention is achieved in consideration of the above circumstances, and has an object to provide a method of manufacturing tin-plated copper terminal material for a terminal crimped to a terminal end of an electric wire made of aluminum wire material, using copper or copper alloy and having anti-galvanic corrosion property and excellent adhesiveness of a tin layer.

Solution to Problem

A method of manufacturing a tin-plated copper terminal material according to the present invention includes a zinc-nickel alloy layer forming step forming a zinc-nickel alloy layer having a nickel content of 5 mass % to 50 mass % inclusive and a thickness of 0.1 µm to 5.0 µm inclusive on a base member made of copper or copper alloy, and a tin-plating step forming a tin layer by tin plating on the zinc-nickel alloy layer.

Previous to the tin-plating step, the zinc-nickel alloy layer including prescribed content of nickel is formed: accordingly, a substitution reaction can be reduced while tin-plating and adhesiveness of the tin layer can be improved. In this case, if the nickel content in the zinc-nickel alloy layer is less than 5 mass %, the substitution reaction may occur while tin-plating so that the adhesiveness of the tin layer is remarkably deteriorated.

By forming the zinc-nickel alloy layer is formed under the tin layer, metal zinc is diffused from the zinc-nickel alloy layer and concentrated at a surface of the tin layer. Since corrosion potential of the metal zinc is near to that of aluminum, the galvanic corrosion can be reduced when it is in contact with an aluminum electric wire. In this case, if the nickel content in the zinc-nickel alloy layer is greater than 50 mass %, zinc is not diffused enough, so that an effect of lowering a corrosion potential at the surface cannot obtained.

The thickness of the zinc-nickel alloy layer is 0.1 µm to 5.0 µm inclusive: because if the thickness is less than 0.1 µm, the effect of lowering the corrosion potential at the surface cannot be obtained; and if it is greater than 5.0 µm, cracks may occur while a pressing step of a terminal.

In a terminal obtained by shaping the terminal material manufactured as above, a metal zinc layer is maintained to be highly-concentrated since zinc is gradually diffused to the surface part of the tin layer from the zinc-nickel alloy layer under the tin layer. Even if a whole or a part of the tin layer is disappeared by wearing and the like, the galvanic corrosion can be reduced by the zinc-nickel alloy layer thereunder.

In the method of manufacturing the tin-plated copper terminal material according to the present invention, it is preferable that a crystalline structure of the zinc-nickel alloy layer be a single phase of a γ phase.

The γ phase has a corrosion resistance higher than that of an η phase, so that the substitution reaction can be reduced while tin-plating, and voids can be remarkably reduced at an interface.

In the method of manufacturing the tin-plated copper terminal material according to the present invention, it is preferable to further include a ground layer forming step forming a ground layer made of nickel or nickel alloy on a surface of the base member previous to the zinc-nickel alloy layer forming step, the ground layer having a nickel content of 80 mass % or greater and a thickness of 0.1 µm to 5.0 µm inclusive.

By forming the zinc-nickel alloy layer on the ground layer made of nickel or nickel alloy provided on the base member, it is possible to improve the adhesiveness of the zinc-nickel alloy layer. If the thickness of the ground layer is less than 0.1 µm, an effect of improving the adhesiveness of the zinc-nickel alloy layer is poor; or the effect is saturated if forming a film at a thickness greater than 5.0 µm. If the nickel content in the ground layer is less than 80 mass %, an effect of improving the adhesiveness is poor.

By providing this ground layer, There also is an effect of preventing diffusion of copper from the base member made of copper or copper alloy to the zinc-nickel alloy layer or the tin layer.

In the method of manufacturing the tin-plated copper terminal material according to the present invention, it is preferable that a diffusion treatment step diffusing zinc from the zinc-nickel alloy layer to the tin layer by maintaining 40° C. to 160° C. inclusive for 30 minutes or longer following the tin-plating step be further included.

The above-mentioned diffusion of metal zinc in the zinc-nickel alloy layer occurs even at room temperature though, by performing the diffusion treatment with this temperature condition, it is possible to diffuse zinc promptly. If it is lower than 40° C., an effect of diffusing zinc in a short time is poor. If it is exposed at temperature of 40° C. or higher for 30 minutes or longer, a concentrated layer of metal zinc can be reliably formed on a surface of the tin layer. If it exceeds 160° C., tin is diffused to the zinc-nickel alloy layer conversely, the diffusion of zinc is impeded. If it further exceeds 190° C., the tin layer is melted and the melted tin is repelled by the zinc-nickel alloy layer, so that unpreferable tin-repelled parts may be generated.

In the method of manufacturing the tin-plated copper terminal material according to the present invention, it is preferable that the base member be formed into a hoop material by previous press working to have a belt-plate shape, and a plurality of terminal parts to be formed into terminals be connected to a carrier part along a longitudinal direction of the belt-plate shape, with spacing each other along a longitudinal direction of the carrier part.

By previously making the terminal parts, the zinc-nickel alloy layer and the tin layer are formed on end surfaces of the base member, so that an excellent anti-corrosion effect can be shown also including the end surfaces.

Advantageous Effects of Invention

According to the method of manufacturing the tin-plated copper terminal material of the present invention, by forming the zinc-nickel alloy layer including nickel previous to the tin-plating step, the substitution reaction while tin plating is reduced, so that the adhesiveness of the tin layer can be improved. Furthermore, by the metal zinc layer formed by diffusing over the surface of the tin layer, it is possible to prevent the galvanic corrosion owing to the contact with the aluminum-made electric wire. Moreover, it is possible to maintain the metal zinc layer highly-concentrated by the diffusion from the zinc-nickel alloy layer under the tin layer, and it is possible to form the terminal having an excellent corrosion resistance for a long time period.

DESCRIPTION OF EMBODIMENTS

Figure 3:
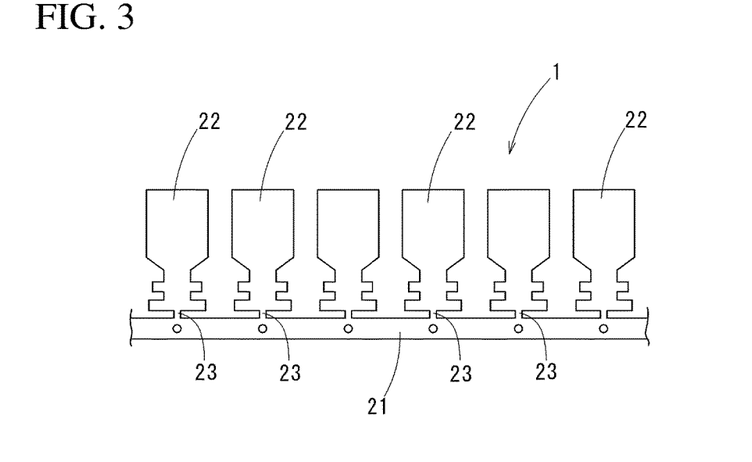
FIG. 3 It is a plan view of the terminal material of the embodiment.

A method of manufacturing a tin-plated copper terminal material of an embodiment of the present invention will be explained. The tin-plated copper terminal material formed by the manufacturing method according to the present invention will be explained in advance. The tin-plated copper terminal material 1 is, as a whole thereof is shown in FIG. 3, a hoop material having a belt-plate shape in order to form a plurality of terminals: on a carrier part 21 along a longitudinal direction, a plurality of terminal parts 22 to be formed into the terminals are disposed with spacing along a longitudinal direction of the carrier part 21; and each of the terminal parts 22 is connected to the carrier part 21 via a connection part 23 having a narrow width. Each of the terminal parts 22 is formed to have a shape of a terminal 10 shown in FIG. 10 for example, and finished as the terminal 10 by being cut from the connection part 23.

In each of the terminals 10 (a female terminal is shown as an example in FIG. 10), a connector part 11 into which a male terminal (not illustrated) is fitted, a core-wire crimp part 13 to which an exposed core wire 12a of an electric wire 12 is crimped, and a coat crimp part 14 to which a covered part 12b of the electric wire 12 is crimped are integrally formed in this order from a tip thereof.

Figure 11:
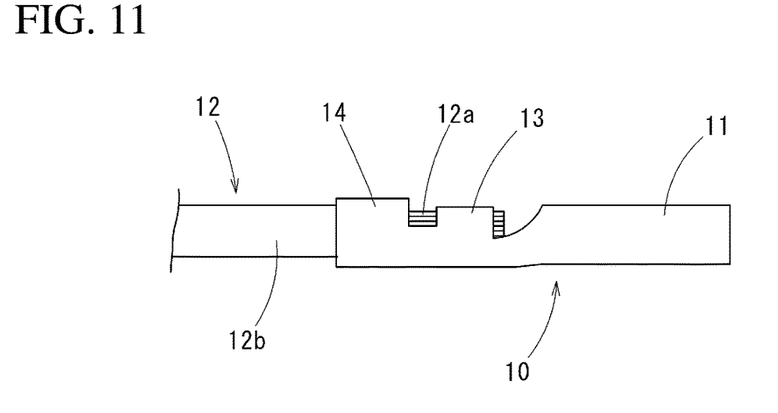
FIG. 11 It is a frontal view showing a terminal end part of an electric wire to which the terminal of FIG. 10 is crimped.

FIG. 11 shows a terminal-end structure in which the terminal 10 is crimped to the electric wire 12; the core-wire crimp part 13 is directly in contact with the core wire 12a of the electric wire 12.

Figure 2:
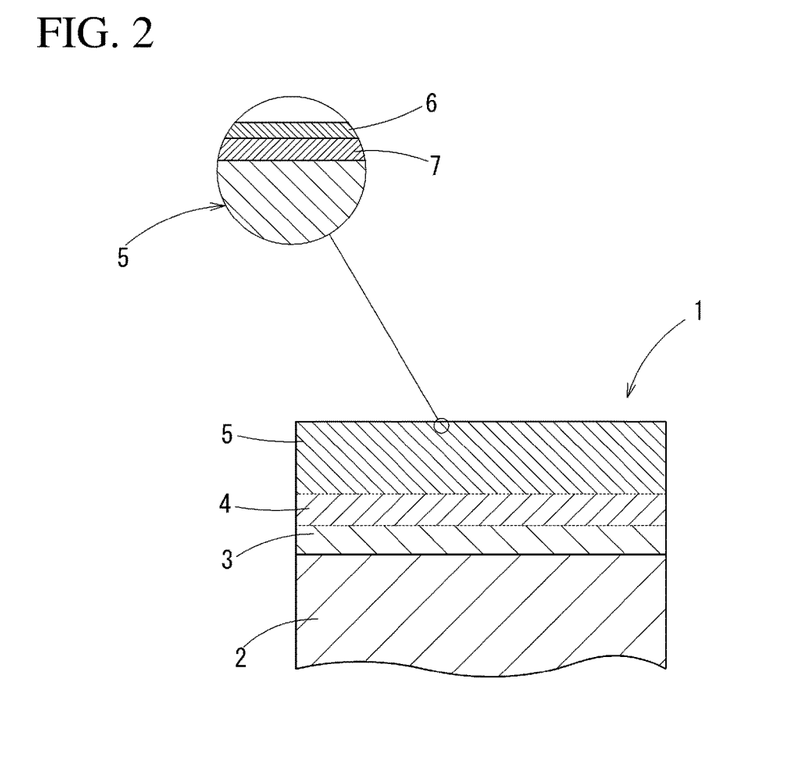
FIG. 2 It is a sectional view schematically showing an embodiment of the tin-plated copper alloy terminal material manufactured by the manufacturing method of the present invention.

In the tin-plated copper terminal material 1, as a cross section thereof is schematically shown in FIG. 2, a ground layer 3 made of nickel or nickel alloy, a zinc-nickel alloy layer 4, and a tin layer 5 are stacked on a base member 2 formed of copper or copper alloy in this order; and further on the tin layer 5 and under an oxide layer 6 formed at the outermost surface thereof, a metal zinc layer 7 is formed.

Next, a method of manufacturing this tin-plated copper terminal material will be explained. The base member 2 is enough to be made of copper or copper alloy, and composition thereof is not particularly limited.

Forming the base member 2 into hoop material having a shape shown in FIG. 3 by press working or the like (a base-member forming step); and then a ground-layer forming step in order to form the ground layer 3 made of nickel or nickel alloy on the hoop material, a zinc-nickel alloy layer forming step in order to form the zinc-nickel alloy layer 4, a tin-plating step forming the tin layer 5 made of tin or tin alloy, and a diffusion treatment step diffusing zinc in the zinc-nickel alloy layer into the tin layer by maintaining a prescribed temperature for a prescribed time after forming the tin layer 5 are performed in this order.

Figure 1:
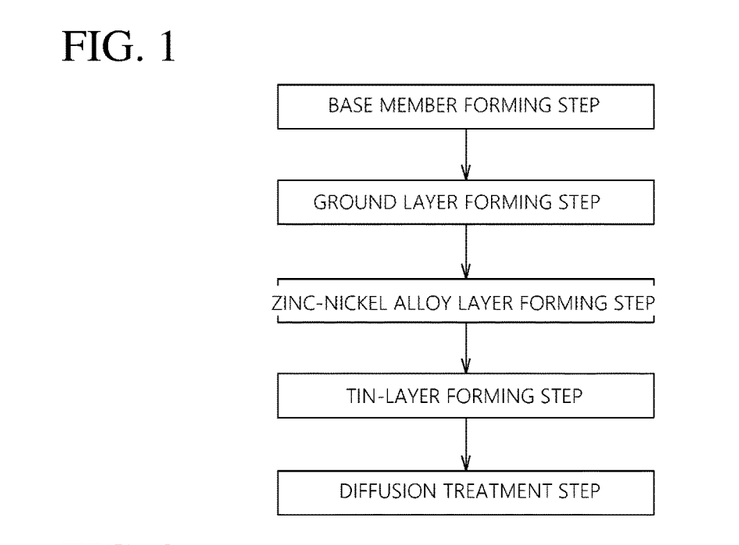
FIG. 1 It is a flow chart showing an embodiment of a method of manufacturing a tin-plated copper alloy terminal material according to the present invention.

Below, it will be explained respectively in accordance with a flow chart in FIG. 1.

Base-Member Forming Step

Performing cutting, perforating and the like on this plate material, as shown in FIG. 3, the hoop material in which the plurality of terminal parts 22 are connected to the carrier part 21 via the connection parts 23 is formed. After press working, a surface is cleaned by performing degreasing, pickling and the like.

Ground Layer Forming Step

The ground layer 3 is formed on the hoop material after the base-member forming step. Plating of nickel or nickel alloy for forming the ground layer 3 is enough, not particularly limited if a dense film mainly composed of nickel can be obtained, and can be formed by electronic plating using a known Watt bath, a sulfamate bath, a citric acid bath or the like. For nickel alloy plating, nickel-tungsten alloy (Ni—W), nickel-phosphorus alloy (Ni—P), nickel-cobalt alloy (Ni—Co), nickel-chrome alloy (Ni—Cr), nickel-iron alloy (Ni—Fe), nickel-zinc alloy (Ni—Zn), nickel-boron alloy (Ni—B) and the like can be used.

Considering a pressing bending property of the terminal 10 and a barrier property against copper, pure nickel plating obtained from the sulfamate bath is desirable.

The ground layer 3 formed as above has a thickness of 0.1 µm to 5.0 µm inclusive and a nickel content is 80 mass % or greater. The ground layer 3 has a function of preventing to diffusion of copper from the base member 2 to the zinc-nickel alloy layer 4 and the tin layer 5. If the thickness is less than 0.1 µm an effect of preventing diffusion of copper is poor; or if it exceeds 5.0 µm cracks are easy to occur by the press working. It is more desirable that the thickness of the ground layer 3 be 0.3 µm to 2.0 µm inclusive.

If the nickel content is less than 80 mass %, the effect of preventing diffusion of copper to the zinc-nickel alloy layer 4 and the tin layer 5 is small. It is more preferable that the nickel content be 90 mass % or greater.

Zinc-Nickel Alloy Layer Forming Step

Zinc-nickel alloy plating for forming the zinc-nickel alloy layer 4 is enough if a dense film can be obtained with a prescribed composition, and is not particularly limited: it is possible to use a known sulfate bath, a chloride salt bath, a neutral bath, and the like. It is important to control the nickel content to a prescribed value in order to prevent tin substitution while the tin-plating step.

In this case, the nickel content and a crystalline structure of the zinc-nickel alloy layer 4 can be controlled by controlling a ratio of concentration between zinc and nickel in the plating bath.

The zinc-nickel alloy layer 4 has a thickness of 0.1 µm to 5.0 µm inclusive, includes zinc and nickel, and also includes tin since it is adjacent to the tin layer 5. A nickel content of the zinc-nickel alloy layer 4 is 5 mass % to 50 mass % inclusive.

If the thickness of the zinc-nickel alloy layer 4 is less than 0.1 µm, there is no effect of lowering corrosion potential at a surface; if it exceeds 5.0 µm, cracks may occur while pressing the terminal 10. It is more preferable that the thickness of the zinc-nickel alloy layer 4 be 0.3 µm to 2.0 µm inclusive.

If the nickel content of the zinc-nickel alloy layer 4 is less than 5 mass %, substitution reaction occurs while tin plating stated below for forming the tin layer 5, so that adhesiveness of tin plating (the tin layer 5) is considerably deteriorated. If the nickel content in the zinc-nickel alloy layer 4 exceeds 50 mass %, there is no effect of lowering corrosion potential at a surface. It is more preferable that the nickel content be 7 mass % to 20 mass % inclusive.

It is preferable that the zinc-nickel alloy layer 4 be a single phase of a γ phase. Substitution reaction while tin plating is reduced because the γ phase has corrosion resistance higher than that of a η phase, so that voids can be remarkably reduced at an interface.

In order to obtain the zinc-nickel alloy layer of the single phase of the γ phase, it is preferable to use an acid solution such as a weak acidity sulfate bath, a chloride bath and the like, and to control a ratio of zinc and nickel in the bath to be the single phase of the γ phase.

Figure 4:
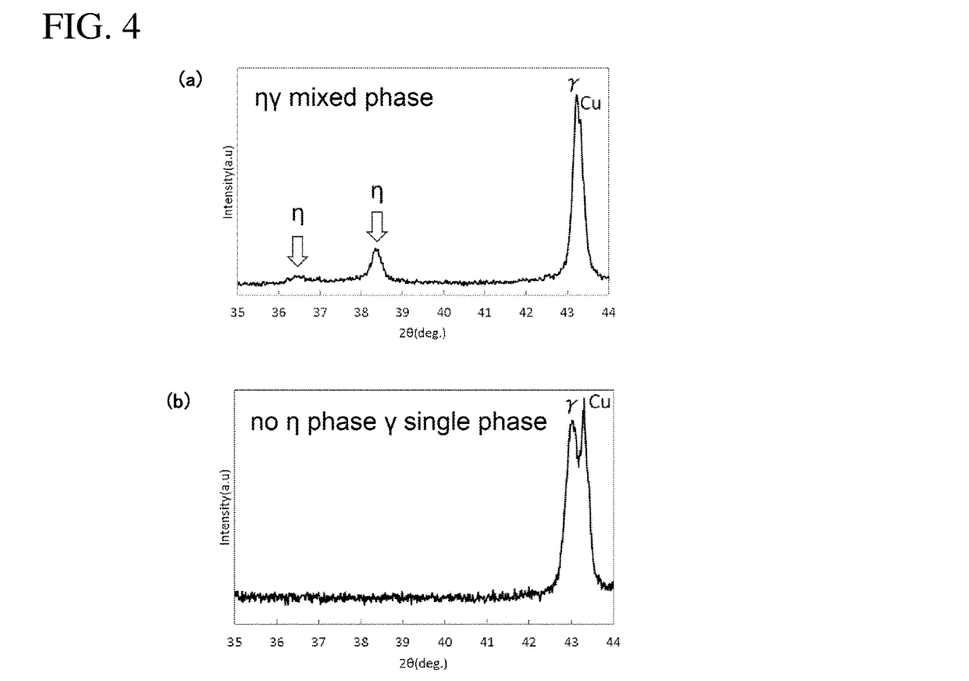
FIG. 4 It is a view showing X-ray diffraction patterns at a surface of a zinc-nickel alloy layer.

It is possible to confirm distinction whether it is the single phase of the γ phase or not by analyzing material on which zinc-nickel plating is performed, by X-ray diffraction method. In a case in which copper is used for an X-ray source, peaks can be confirmed at 2θ=36.5° and near 2θ=38.3° regarding the η phase, and near 2θ=43.1° regarding the γ phase. A part (a) of FIG. 4 shows a mixed phase state of the γ phase and the η phase; and a part (b) of the same figure shows a single phase state of the γ phase. There is a case in which the peak of the γ phase cannot be confirmed because the peak of the γ phase is near to a peak of copper and may overlaps with the peak of copper depending on a plating thickness. In a case in which nickel concentration is relatively low, principal phases of zinc-nickel alloy are the η phase and the γ phase; it can be found by existence of the η phase whether it is the single phase of the γ phase or not.

Tin-Plating Step

Plating of tin or tin alloy for forming the tin layer 5 can be performed by a known method. For example, it is possible to perform electric plating using an organic acid bath (such as a phenol-sulfonic acid bath, an alkane-sulfonic acid bath, or an alkanol-sulfonic acid bath), an acid bath such as a fluoroboric acid bath, a halide bath, a sulphate bath, or a pyrophosphoric acid bath, or an alkaline bath such as a potassium bath, a natrium bath or the like.

Considering formation of a plating film at high speed, minuteness of the plating film, and easiness of zinc diffusion, it is preferable to use the acid organic acid bath and the sulphate bath.

The tin layer 5 formed in this step has preferably a thickness of 0.1 μm to 10 μm inclusive: if it is too thin, soldering wettability and contact resistance may be deteriorated; or if it is too thick, dynamic friction coefficient at a surface may be increased, so that mounting/dismounting resistance may be increased when it is used for a connector.

Diffusion Treatment Step

In the diffusion treatment step, temperature is maintained at a surface temperature of material being 40° C. to 160° C. inclusive for 30 minutes or longer. By this diffusion treatment, zinc in the zinc-nickel alloy layer is diffused over the tin layer and a thin metal zinc layer is formed at the surface. The metal zinc layer 7 can be formed by exposing at temperature of 40° C. or higher and 30 minutes or longer because zinc is diffused promptly. However, if it exceeds 160° C., the diffusion of zinc is prevented by diffusion of tin to the zinc-nickel side conversely; and if it further exceeds 190° C., zinc-nickel alloy repels melted tin so that tin-repelled parts are formed at the tin layer 5: accordingly, it is not heated to temperature higher than 190° C.

The tin-plated copper terminal material 1 manufactured as above has an overall structure in which the ground layer 3 made of nickel or nickel alloy, the zinc-nickel alloy layer 4, and the tin layer 5 are stacked on the base member 2 in this order: and further, the oxide layer 6 is thinly formed on a surface of the tin layer 5 and the metal zinc layer 7 is formed under the oxide layer 6.

The metal zinc layer 7 is formed, for example, to have a zinc concentration of 5 at % to 40 at % inclusive and a thickness in SiO$_2$ conversion of 1 nm to 10 nm inclusive.

Note that the layer 6 of oxide of zinc and tin is formed at an outermost surface.

Figure 10:
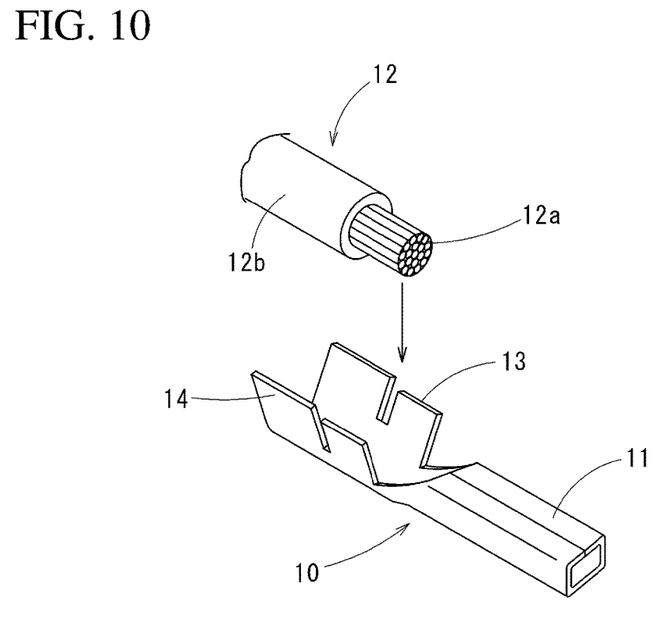
FIG. 10 It is a perspective view showing an example of a terminal in which terminal material of the embodiment is used.

Then, forming the hoop material as it is to have the shape of the terminal 10 shown in FIG. 10 and cutting the connection parts 23 by press working or the like, the terminals 10 are formed.

FIG. 11 shows a terminal end structure in which the terminal 10 is crimped to the electric wire 12; the core-wire crimp part 13 is directly in contact with the core wire 12a of the electric wire 12.

In the terminal 10, since the metal zinc layer 7 is formed under the oxide layer 6 at the outermost surface of the tin layer 5, and the corrosion potential of metal zinc is very near to that of aluminum, it is possible to prevent the galvanic corrosion even if it is crimped to the aluminum-made core wire 12a. In this case, the base member 2 is not exposed even at end surfaces of the terminal 10 since it is plated and heat-treated when it is the hoop-material state in FIG. 3, excellent anti-corrosion effect can be shown.

Moreover, the zinc-nickel alloy layer 4 is formed under the tin layer 5, and zinc thereof is diffused to the surface part of the tin layer 5: the metal zinc layer 7 is prevented from disappearing by wearing and the like and the metal zinc layer 7 is maintained to be highly-concentrated. Even if the tin layer 5 is fully or in a part disappeared by wearing and the like, because the zinc-nickel alloy layer 4 thereunder has the corrosion potential near to that of aluminum, the galvanic corrosion can be reduced.

The present invention is not limited to the above-described embodiment and various modifications may be made without departing from the scope of the present invention.

In the above embodiment, the diffusion treatment step was performed after the tin-plating step though, the diffusion treatment step is not always necessary: it is possible to form the terminal without the diffusion treatment step. It is preferable to perform the above-mentioned diffusion treatment step, because zinc is diffused in a short time: on the other hand if the diffusion treatment step is not performed, by leaving it in room temperature of 10° C. or higher for example, metal zinc is diffused to the tin layer 5 from the zinc-nickel alloy layer 4, so that it is possible to form the metal zinc layer 7 at the surface of the tin layer 5.

EXAMPLES

A copper plate as the base member was electrolytic degreased and pickled, and nickel plating for the ground layer, zinc-nickel alloy plating, and tin plating were performed in order. Respective conditions of the plating were as follows. Thicknesses of the ground layer and the zinc-nickel alloy layer obtained by performing these plating were shown in Table 1. The ground layer was not formed for Sample 1. The zinc-nickel alloy plating was not performed on Sample 9. Regarding the nickel alloy plating, nickel-iron plating was performed on Sample 2, nickel-phosphorus plating was performed on Sample 4, and nickel tungsten plating was performed on Sample 5.

Condition for Nickel Plating
Composition of Plating Bath
   Nickel Amidosulfate: 300 g/L
   Nickel Chloride: 5 g/L
   Boric Acid: 30 g/L
Bath Temperature: 45° C.
Current Density: 5 A/dm$^2$
   Condition for Zinc-Nickel Alloy Plating
Composition of Plating Bath
   Zinc Sulfate Heptahydrate: 75 g/L
   Nickel Sulfate Hexahydrate: 180 g/L
   Sodium Sulfate: 140 g/L
pH=2.0
Bath Temperature: 45° C.
Current Density: 5 A/dm$^2$ This condition for zinc-nickel plating was an example for the nickel content being 15 mass %. The nickel content in the zinc-nickel alloy layer was made into the contents shown in Table 1 by controlling the ratio of concentration between zinc and nickel in the plating bath.

Condition for Tin Plating
Composition of Plating Bath
   Stannous Methanesulfonate: 200 g/L
   Methane Sulfonic Acid: 100 g/L
   Additive Bath Temperature: 25° C.
Current Density: 5 A/dm$^2$ The nickel content was measured by using an electron probe micro analyzer (EPMA) JXA-8530F made by JEOL Ltd. and observing a sample in which a zinc-nickel alloy plating film was only formed at the prescribed plating condition, from a surface, with acceleration voltage of 6.5 kV at a beam diameter of 30 μm. Regarding the crystalline structure of the zinc-nickel alloy layer, it was confirmed by analyzing the surface by X-ray diffraction method before forming the tin layer by performing the zinc-nickel plating. Copper was used for an X-ray source.

TABLE 1

| Sample No. | Ground Layer | | Zn—Ni Alloy Layer | | | Diffusion Treatment | |
|---|---|---|---|---|---|---|---|
| | Thickness (μm) | Ni Content (%) | Thickness (μm) | Ni Content (%) | Crystalline Structure | Temperature (° C.) | Time (min.) |
| 1 | 0 | — | 0.1 | 5 | η γ mixed phase | — | — |
| 2 | 5.5 | 60(Ni—Fe) | 5.0 | 50 | undefined | — | — |
| 3 | 0.05 | 100 | 1.0 | 7 | γ single phase | — | — |
| 4 | 0.1 | 90(Ni—P) | 5.0 | 20 | γ single phase | — | — |
| 5 | 5.0 | 80(Ni—W) | 2.0 | 18 | γ single phase | 130 | 90 |
| 6 | 2.0 | 100 | 1.5 | 15 | γ single phase | 35 | 25 |
| 7 | 1.0 | 100 | 1.5 | 15 | γ single phase | 40 | 35 |
| 8 | 1.0 | 100 | 1.5 | 15 | γ single phase | 120 | 60 |
| 9 | 1.0 | 100 | — | — | γ single phase | — | — |
| 10 | 2.5 | 100 | 5.2 | 6 | η γ mixed phase | — | — |
| 11 | 0.2 | 100 | 2.5 | 4 | η γ mixed phase | — | — |
| 12 | 2.3 | 100 | 3.5 | 58 | undefined | — | — |
| 13 | 2.0 | 100 | 0.07 | 6 | η γ mixed phase | — | — |

Next, regarding Samples 5 to 8 among the copper plates with the plating layers, the diffusion treatment were performed at the temperature condition shown in Table 1 so as to make the samples. Regarding the obtained samples, the thicknesses and the concentrations of the metal zinc layer at the surface of the tin layer were measured, and the corrosion currents, bending workability, existence of the interface void, and the contact resistance were measured and evaluated.

Thickness and Concentration of Metal Zinc Layer

The thicknesses and the concentrations of the metal zinc layers were measured at the respective samples by XPS analysis while etching the surfaces of the samples by argon ion using XPS (X-ray photoelectron spectroscopy) analyzer (ULVAC PHI model-5600LS) made by Ulvac-Phi, Inc. Analyzing conditions are as follows.
X-ray Source: Standard MgKα 350 W
Path Energy: 187.85 eV (Survey), 58.70 eV (Narrow)
Measured Interval: 0.8 eV/step (Survey), 0.125 eV (Narrow)
Photo-electron Take-off Angle with respect to Sample Surface: 45 deg
Analyzing Area: about 800 μm (diameter)

Regarding the thicknesses, using an etching rate of SiO$_2$ measured by a same device in advance, "a film thickness in SiO$_2$ conversion" was calculated from a time for measuring.

Etching rates of SiO$_2$ were calculated by etching the SiO$_2$ film having a thickness of 20 nm by argon ion at a rectangle area of 2.8×3 5 mm, and dividing by the time for etching 20 nm of the SiO$_2$ film. It took 8 minutes for the above analyzing device, so the etching rate is 2.5 nm/min. In order to obtain a value of a film thickness itself, flat samples having known film thicknesses should be prepared and the etching rate should be calculated, even though depth resolution by XPS is high about 0.5 nm, because the time for etching by Ar ion beam is different in accordance with materials. This is not easy, so the "film thickness in SiO$_2$ conversion" calculated from the time for etching was utilized, using the etching rate calculated at the SiO$_2$ film having known film thickness. Accordingly, it is necessary to pay attention that the "film thickness in SiO$_2$ conversion" is different from a film thickness of an actual oxide. If the thickness is provided by the etching rate in SiO$_2$ conversion, even if the actual film thickness is not identified, it is possible to evaluate the film thickness quantitatively because it is unequivocal.

Corrosion Current

Regarding the corrosion current, disposing a pure aluminum wire coated by resin except an exposed part of 2 mm diameter and a sample coated by resin except an exposed part of 6 mm diameter with facing the exposed parts each other with a distance of 1 mm, the corrosion current was measured flowing between the aluminum wire and the sample in salt water of 5 mass % and 23° C. A zero shunt ammeter HA1510 made by Hokuto Denko Corporation was used for measuring the corrosion current, so that the corrosion currents were compared before and after heating the sample at 150° C. for one hour. Average current for 1000 minutes was compared.

Bending Workability

Regarding the bending workability, cutting a sample piece so that a rolling direction was a longitudinal direction, the bending was performed at a pressure of 9.8×10$^3$ N perpendicular to the rolling direction using a W bending test device provided in JIS H 3110. Then, observation were performed by a stereoscopic microscope. Evaluation of the bending workability was provided as follows. If there was no visible crack at a bend part after the test, it was evaluated "EXCELLENT". If exposure of copper alloy mother material by a crack was not found even though there was a crack, it was evaluated "GOOD". If the copper alloy mother material was exposed by the crack, it was evaluated "BAD".

Contact Resistance

Conforming JCBA-T323, the contact resistance was measured using a four-probe contact resistance measuring device (made by Yamasaki Seiki Institute, Inc.: CRS-113-AU) by sliding (1 mm) at a pressure 0.98 N. The measurement was performed on a plated surface of a flat plate sample.

Interface Void

For confirming existence of an interface void by tin substitution while tin-plating, cross section of each of Samples was treated by a cross section polisher; and a vicinity of the interface between the nickel-zinc alloy layer and the tin layer was observed by a field emission scanning electron microscope. If a definite void having a diameter larger than 0.3 μm, it was evaluated "FOUND": or if there was no definite void, it was evaluated "NOT FOUND".

These results are shown in Table 2.

TABLE 2

| Sample No. | Metal Zinc Layer | | Corrosion Current (μA) | | Bending Workability | Interface Void | Contact Resistance (mΩ) |
| | Thickness in SiO$_2$ (nm) | Concentration (at %) | Before Heating | After Heating | | | |
|---|---|---|---|---|---|---|---|
| 1 | 7 | 20 | 3.0 | 6.5 | EXCELLENT | Small | 0.7 |
| 2 | 2 | 6 | 3.0 | 5.5 | GOOD | Small | 1.8 |
| 3 | 2.5 | 25 | 3.6 | 4.9 | EXCELLENT | NOT FOUND | 0.6 |
| 4 | 1 | 5 | 3.3 | 2.6 | EXCELLENT | NOT FOUND | 1.0 |
| 5 | 5 | 10 | 3.5 | 3.3 | EXCELLENT | NOT FOUND | 1.5 |
| 6 | 5 | 30 | 2.9 | 3.1 | EXCELLENT | NOT FOUND | 1.2 |
| 7 | 2.5 | 18 | 1.7 | 1.9 | EXCELLENT | NOT FOUND | 0.8 |
| 8 | 4 | 30 | 1.2 | 1.5 | EXCELLENT | NOT FOUND | 0.9 |
| 9 | — | — | 8.5 | 9.0 | EXCELLENT | NOT FOUND | 0.8 |
| 10 | 3 | 10 | 3.1 | 3.9 | BAD | Small | 1.3 |
| 11 | 10 | 40 | 4.9 | 5.3 | BAD | Many | 3.5 |
| 12 | 0.6 | 5 | 6.9 | 7.5 | GOOD | Small | 2.0 |
| 13 | 1.25 | 9 | 5.5 | 7.1 | GOOD | Small | 1.3 |

Figure 5:
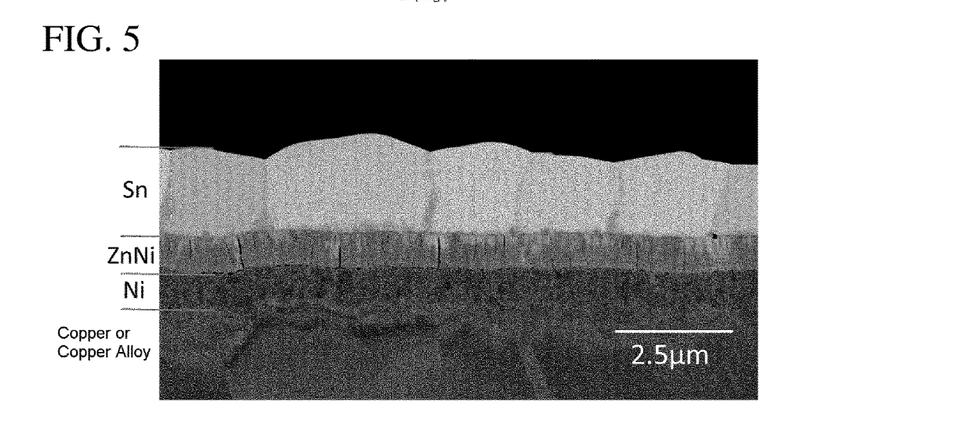
FIG. 5 It is a photomicrograph of a cross section of terminal material of Sample 2.

FIG. 5 is a microphotograph of a cross section of Sample 7. It can be found that the ground layer (a nickel layer), the zinc-nickel alloy layer, and the tin layer are formed from the base member side. The outermost surface part of the tin layer cannot be discriminated.

Figure 6:
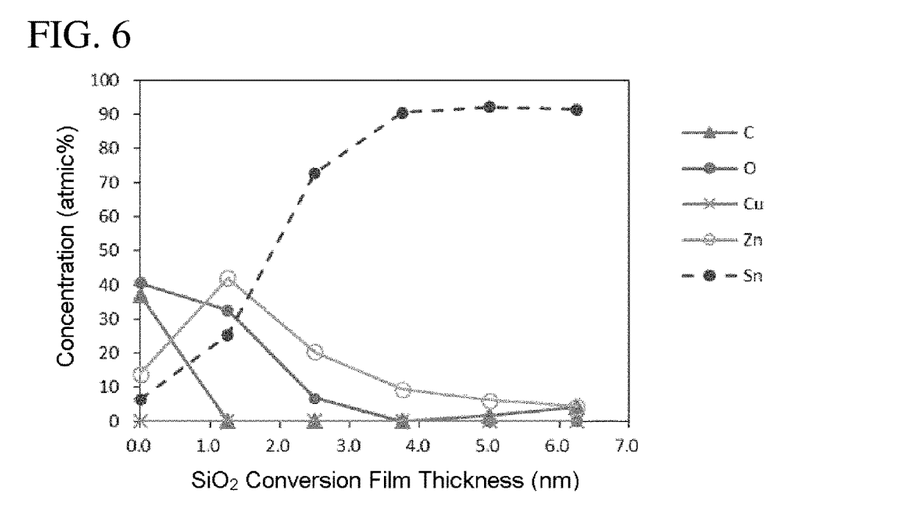
FIG. 6 It is a drawing of concentration distribution of elements in a depth direction at a surface part of the terminal material of Sample 2 by XPS analysis.

FIG. 6 is a concentration distribution drawing of the respective elements in a depth direction in the surface part of Sample 7 by XPS analysis. It can be found that the metal zinc layer having high zinc concentration exists in a vicinity of the surface.

Figure 7:
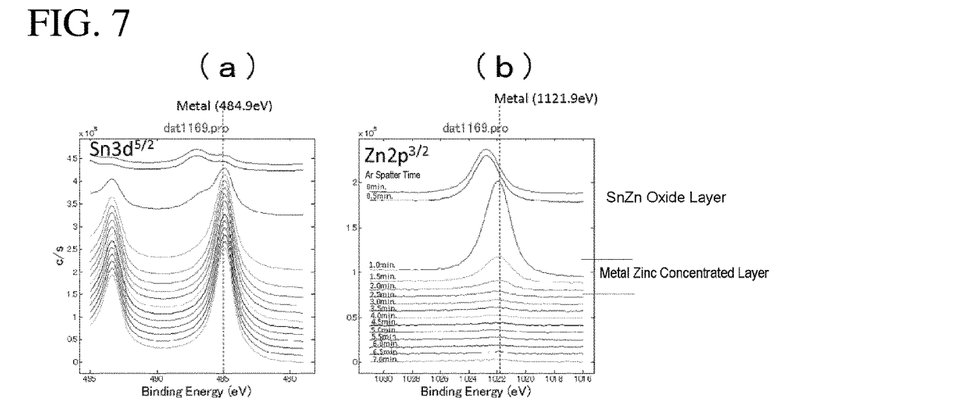
FIG. 7 It is a chemical condition analysis drawing in the depth direction at the surface part of the terminal material of Sample 2: a part (a) is an analysis drawing regarding tin, and a part (b) is an analysis drawing regarding zinc.

FIG. 7 shows analysis diagrams of chemical states in the depth direction of Sample 7. From a chemical shift of binding energy, it can be judged that oxide is principal in a depth range of 1.25 nm from the outermost surface, and metal zinc is principal in a range deeper than the depth of 2.5 nm.

From the results in Table 2, it can be found that in Samples 1 to 8 in which the zinc-nickel alloy layer having the nickel content of 5 mass % to 50 mass % inclusive and the thickness of 0.1 μm to 5.0 μm inclusive were formed and then tin plated, voids generated owing to the tin substitution are very little or not found, so that excellent anti galvanic corrosion effect and good bending workability are shown. Among those, in Samples 3 to 8 with the single γ phase of the zinc-nickel alloy layer, no voids were found at all.

Samples 4 to 8 in which the ground layer having the thickness of 0.1 μm to 5.0 μm inclusive and the nickel content of 80 mass % or greater was formed between the base member and the zinc-nickel alloy layer have a better anti galvanic corrosion effect than Sample 1 without the ground layer. Among these, Samples 7 and 8 which were maintained at temperature of 40° C. to 160° C. inclusive for 30 minutes or longer as the diffusion treatment show particularly good results such that the bending workability is good and the contact resistance is lower than the others.

Sample 9 of a comparative example showed high corrosion current because the zinc-nickel alloy layer was not formed. In Sample 10, the thickness of the zinc-nickel alloy layer exceeds 5.0 μm, serious cracks are generated at the plating surface, and the bending workability is poor. In Sample 11, the nickel content in the zinc-nickel alloy layer was lower than 5 mass %, so that the interface voids were generated, the adhesiveness of the tin layer was poor, and cracks were generated while the bending performance. In Sample 12, the nickel content in the zinc-nickel alloy layer was greater than 50 mass %, so that zinc was not diffused enough and the corrosion current was high. In Sample 13, the zinc-nickel alloy layer was thin 0.07 μm, so that zinc was not diffused enough and the corrosion current was high.

Figure 8:
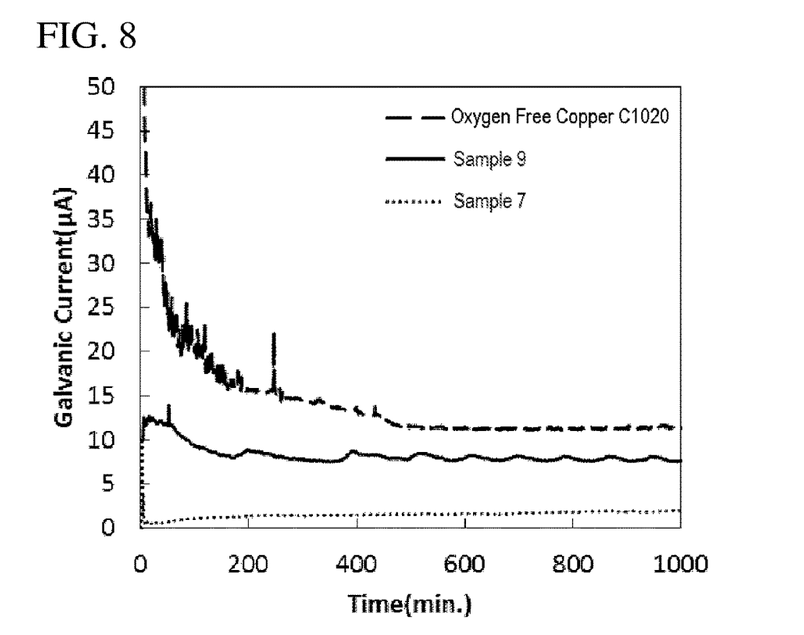
FIG. 8 It is a graph of measuring progress of each galvanic corrosion regarding terminal materials of Sample 2 and Sample 8, and copper terminal material without plating.

FIG. 8 shows results of measuring the corrosion current of Sample 7 and Sample 9. Value of a terminal material made of oxygen free copper (C1020) without plating is also shown for reference. The larger the corrosion current in positive value is, the more the aluminum wire is damaged by galvanic corrosion. Sample 7 of an example has small corrosion current as shown in FIG. 8, it can be found that the galvanic corrosion can be reduced.

Figure 9:
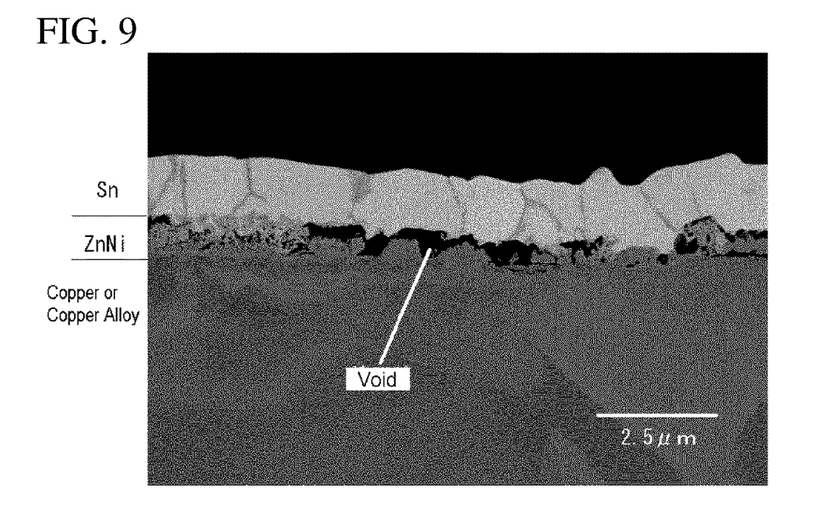
FIG. 9 It is a photomicrograph of a cross section of terminal material of Sample 13.

FIG. 9 is a result of observing a cross section of Sample 11: it can be found that the zinc-nickel alloy layer suffers tin substitution reaction while tin plating, definite voids are formed, and a bonding interface is rough.

INDUSTRIAL APPLICABILITY

It can be used as a terminal in which galvanic corrosion does not occur even if it is crimped to a terminal end of an electric wire made of an aluminum wire material even though it is a terminal made of copper or copper alloy.

REFERENCE SIGNS LIST

1 tin-plated copper terminal material
2 base member 3 ground layer
4 zinc-nickel alloy layer
5 tin layer
6 oxide layer
7 metal zinc layer
10 terminal
11 connector part
12 electric wire
12a core wire
12b covered part
13 core-wire crimp part
14 coat crimp part

The invention claimed is:

1. A method of manufacturing a tin-plated copper terminal material comprising steps of:
   a zinc-nickel alloy layer forming step forming a zinc-nickel alloy layer having a nickel content of 5 mass % to 20 mass % inclusive and a thickness of 0.1 μm to 5.0 μm inclusive on a base member made of copper or copper alloy;
   a tin-plating step forming a tin layer by tin plating on the zinc-nickel alloy layer; and
   a diffusion treatment step diffusing zinc from the zinc-nickel alloy layer into the tin layer by maintaining at 40° C. to 160° C. inclusive for 30 minutes to 60 minutes inclusive to form a metal layer at an outer surface of the tin layer following the tin-plating step, wherein the metal layer comprises zinc having a zinc concentration of 5 at % to 40 at % inclusive; and
   wherein a crystalline structure of the zinc-nickel alloy layer is a single phase of a γ phase.

2. The method of manufacturing the tin-plated copper terminal material according to claim 1, further comprising a ground-layer forming step forming a ground layer made of nickel or nickel alloy on a surface of the base member previous to the zinc-nickel alloy layer forming step, the ground layer having a nickel content of 80 mass % or greater and a thickness of 0.1 μm to 5.0 μm inclusive.

3. The method of manufacturing the tin-plated copper terminal material according to claim 1, wherein
   the base member is formed into a hoop material by previous press working to have a belt-plate shape, and
   a plurality of terminal parts to be formed into terminals are connected to a carrier part along a longitudinal direction of the belt-plate shape, with spacing each other along a longitudinal direction of the carrier part.

* * * * *